US005737162A

United States Patent [19]

Ito et al.

[11] Patent Number: 5,737,162

[45] Date of Patent: Apr. 7, 1998

[54] CIRCUIT BREAKING DEVICE

[75] Inventors: Hiroki Ito; Takashi Moriyama; Kenji Kamei; Suenobu Hamano; Etsuo Nitta; Kazuhiko Arai, all of Tokyo; Naoaki Takeji, Osaka; Koji Takahata, Kagawa; Masayuki Hatano, Tokyo, all of Japan

[73] Assignees: Mitsubishi Denki Kabushiki Kaisha, Tokyo; The Kansai Electric Power Co., Inc., Osaka; Shikoku Electric Power Co., Inc., Takamatsu; Electric Power Development Co., Ltd., Tokyo, all of Japan

[21] Appl. No.: 693,351

[22] Filed: Aug. 6, 1996

[30] Foreign Application Priority Data

Aug. 8, 1995 [JP] Japan .................................... 7-202156

[51] Int. Cl.[6] ........................................ H02H 3/00

[52] U.S. Cl. ........................................ 361/8; 361/13

[58] Field of Search .................................... 361/2, 3, 4, 5, 361/6, 7, 8, 10, 11, 13, 93

[56] References Cited

U.S. PATENT DOCUMENTS

| | | | |
|---|---|---|---|
| 4,442,469 | 4/1984 | Yanabu et al. | 361/4 |
| 5,214,557 | 5/1993 | Hasegawa et al. | 361/4 |

FOREIGN PATENT DOCUMENTS

| | | |
|---|---|---|
| 0 660 352 | 6/1995 | European Pat. Off. . |
| 0 532 394 | 3/1993 | France . |
| 28 21 548 | 11/1978 | Germany . |
| 52-155351 | 12/1977 | Japan . |

OTHER PUBLICATIONS

Yosida, Yoshio, A Study of DC–Current Interruption for GCB with Parallel Capacitor and Reactor, Conference of the Power and Energy Department of the Electric Society (Japan, 1994), No. 621, pp. 824 and 825 (with an English abstract of the relevant portion).

Tokuyama, Shunji, et al., Large DC Current Breaking by Commutating Method Using Negative Resistance Characteristic of Gas Arc, Academy of Electric Engineering, Switch Protective Device Research Group, pp. 41–49, (English abstract provided).

*Primary Examiner*—Jeffrey A. Gaffin
*Assistant Examiner*—Sally C. Medley
*Attorney, Agent, or Firm*—Burns, Doane, Swecker & Mathis, LLP

[57] ABSTRACT

An objective of this invention is to provide a DC circuit breaking device having functions for transmitting direct currents to an electric power system and interrupting direct currents to the electric power system under abnormal conditions such as grounding and short-circuits, where the DC circuit breaking device can minimize the capacity of a condenser for the commuting circuit while rapidly changing the arc voltage to cause arc currents to be quickly extended and vibrated in order to interrupt direct currents in a short arc time. This DC circuit breaking device includes a main DC circuit breaker for interrupting the transmission of direct currents to an electric power system and a DC circuit breaker that is connected in series to the main DC circuit breaker and which is smaller than the main DC circuit breaker. The circuit breaking device also includes a commutation circuit that is connected in parallel to the DC circuit breaker and the small DC circuit breaker which are connected together in series and which is constituted by a reactor and a condenser. The circuit breaking device also includes a surge absorber for absorbing a surged voltage applied to for the condenser.

10 Claims, 8 Drawing Sheets

CIRCUIT BREAKING DEVICE

BACKGROUND OF THE INVENTION

1. Field of the Invention

The present invention relates to a DC circuit breaking device, and in particular, to a DC circuit breaking device including functions for transmitting direct currents to an electric power system and interrupting direct currents to the system under abnormal conditions such as grounding and short circuits.

2. Description of Related Art

FIG. 8 typically shows a conventional self-excited commuting DC circuit breaking device as shown in, for example, "Departmental Journal for the Convention of the Power and Energy Department of the Electric Society in 1995."In this figure, 1 is a DC circuit breaker disposed on a DC line to an electric power system, 3 is a reactor disposed in the DC circuit breaker 1, and 4 is a condenser disposed in parallel with the DC circuit breaker 1. The reactor 3 and the condenser 4 are connected in series to form a commuting circuit. Reference numeral 5 designates a surge absorber connected in parallel to the commuting circuit comprising the reactor 3 and the condenser 4 for absorbing the overvoltage of the condenser 4.

FIG. 9 is a cross sectional view showing the structure of a conventional self-excited commuting DC circuit breaking device. In this case, a puffer-type gas circuit breaker is used as the DC circuit breaker 1. The DC circuit breaking device 1 has a fixed contact 11 and a movable contact 12 that transmit direct currents. One end of the reactor 3 is connected to the fixed contact 11, while the other end is connected one end of the condenser 4, the other end of which is connected to the movable contact 12.

The movable contact 12 has a puffer cylinder 13 and an insulating nozzle 14 fixed thereto. A piston rod 15 is directly connected to the movable contact 12, and withdrawn, pushed, and moved by an operating mechanism 16.

Reference numeral 17 denotes a puffer piston, and 18 is an opening through which $SF_6$ gas surrounded by the movable contact 12, the puffer cylinder 13, and the puffer piston 17 is jetted against the arc when its pressure is increased. Reference numeral 20 is a fixed-side withdrawn conductor connected to the fixed contact 11, 21 is a movable-side withdrawn conductor connected to the movable contact 12.

FIG. 10 is an enlarged cross sectional view showing a puffer-type gas circuit breaker that is one example of the DC circuit breaker 1 used in FIG. 9.

The same components as in FIG. 9 have the same reference numerals, and their description is omitted. Reference numeral 22 indicates $SF_6$ gas surrounded by the movable contact 12, the puffer cylinder 13, and the puffer piston 17.

In this DC circuit breaker 1, when the contacts are parted, the piston rod 15 integrated with the movable contact 12 is moved relative to the fixed contact 11 and the fixed puffer piston 17 in order to generate an arc 19 between the contacts 11 and 12. At this point, as the piston rod 15 moves, the $SF_6$ gas is compressed and jetted through the opening 18 against the arc 19.

Next, the operation is described.

When the operating mechanism 16 is used to withdraw the piston rod 15, the fixed and the movable contacts 11 and 12 are parted to generate an arc 19 between the contacts. The puffer piston 17 then operates to increase the pressure of the $SF_6$ gas inside the puffer cylinder 13, and the gas is jetted from the opening 18 against the arc 19. Direct currents, however, do not periodically cross their zero point as in alternating currents, so the currents cannot be interrupted easily by jetting the $SF_6$ gas against the direct current arc.

Thus, by connecting the series circuit comprising the reactor 3 and the condenser 4 in parallel to the DC circuit breaker 1 as a commutation circuit as described above to commute currents to this commutation circuit, while using the interaction of the commutation circuit and the voltage and current negative characteristics of the $SF_6$ arc to extend arc voltage and current vibrations to form a current zero point, the $SF_6$ gas, the pressure of which has been increased by the puffer piston 17, is jetted from the opening 18 through the insulating nozzle 14 against the arc 19 to extinguish it.

The limit current that can be interrupted by the DC circuit breaker 1 depends on the capacity of the reactor 3 and the condenser 4. That is, if the current that can be interrupted by the DC circuit breaker 1, the capacity of the reactor 3, and the electrostatic capacity of the condenser 4 are referred to as $i_0$, $L_1$, and $C_1$, respectively, $i_0 \propto \sqrt{C_1}$ and the current $i_0$ increases with increasing electrostatic capacity $C_1$. In addition, there is an optimal capacity $L_{1p}$ of the reactor 3 at which the current ie that can be interrupted is the largest.

A reactor and a condenser which are connected in parallel to the DC circuit breaker for extending and vibrating arc currents for commutation generally play an important part in a self-excited commuting DC circuit breaking device. The condenser of the commutation circuit of a conventional device described above, however, has a large capacity, so such devices have a large structure and require high costs.

In addition, conventional devices cannot interrupt arc currents in a short time by rapidly extending and vibrating them.

This invention is proposed to solve the above problems, and its objective is to provide a DC circuit breaker that can interrupt direct currents in a short time by rapidly changing them, which has a small structure, and which requires low costs.

BRIEF SUMMARY OF THE INVENTION

A DC circuit breaking device according to a first aspect of the invention includes a main DC circuit breaker for interrupting the transmission of direct currents to an electric power system and at least one DC circuit breaker that is connected in series to the main DC circuit breaker and which is smaller than the main DC circuit breaker. A commutation circuit that is connected in parallel to the series circuit which is made up of the main and the small DC circuit breakers. The commutation circuit includes a reactor and a condenser, and a surge absorber connected to the condenser.

According to a second aspect of the invention, the small DC circuit breaker comprises a single DC circuit breaker.

Accordance to a third aspect of the invention, the small DC circuit breaker comprises a first and a second DC circuit breakers.

According to a fourth aspect of the invention, a DC circuit breaking device includes a main DC circuit breaker for interrupting the transmission of direct currents to an electric power system; at least one DC circuit breaker that is connected in series to the main DC circuit breaker and which is smaller than the main DC circuit breaker. A commuting circuit is connected in parallel to each of the main and the small DC circuit breakers, and a surge absorber is connected to the condenser.

According to a fifth aspect of the invention, the small DC circuit breaker comprises a single DC circuit breaker with a commutation circuit and a surge absorber connected in parallel thereto.

According to a sixth aspect of the invention, the small DC circuit breaker comprises a first and a second DC circuit breakers each of which comprises the commuting circuit and the surge absorber connected in parallel thereto.

According to a seventh aspect of the invention has an auxiliary condenser connected in parallel to at least one of the commutation circuits which is connected in parallel with the main DC circuit breaker.

According to an eighth aspect of the invention, the capacity of the small DC circuit breaker is half to one-tenths of that of the main DC circuit breaker.

According to a ninth aspect of the invention, the capacity of the second DC circuit breaker is half to one-tenths of that of the first DC circuit breaker.

According to a tenth aspect of the invention, the capacity of the auxiliary condenser is half to one-tenths of that of the main condenser.

According to the first aspect of the invention, at least one DC circuit breaker that is smaller than the main DC circuit breaker is connected in series to the main DC circuit breaker. This enables direct currents to be interrupted in a short time to reduce the stroke of the circuit breaker and the capacity of the commutation circuit, thereby reducing the size of the structure and costs.

According to the second aspect of the invention, the main DC circuit breaker has connected thereto the single small DC circuit breaker that has a smaller capacity than the main DC circuit breaker. This enables direct currents to be interrupted in a short time to reduce the stroke of the circuit breaker and the capacity of the commutation circuit, thereby reducing the size of the structure and costs.

According to the third aspect of the invention, the main DC circuit breaker has connected thereto the two small DC circuit breaks that have a smaller capacity than the main DC circuit breaker. This enables direct currents to be interrupted in a short time to reduce the stroke of the circuit breaker and the capacity of the commutation circuit, thereby reducing the size of the structure and costs.

According to the fourth aspect of the invention, the main DC circuit breaker has connected thereto at least one small DC circuit breaker including the parallel commutation circuit that has a smaller capacity than the main DC circuit breaker. This enables direct currents to be interrupted in a short time to reduce the stroke of the circuit breaker and the capacity of the commutation circuit, thereby reducing the size of the structure and costs.

According to the fifth aspect of the invention, the main DC circuit breaker has connected thereto one small DC circuit breaker including the parallel commutation circuit that has a smaller capacity than the main DC circuit breaker. This enables direct currents to be interrupted in a short time to reduce the stroke of the circuit breaker and the capacity of the commutation circuit, thereby reducing the size of the structure and costs.

According to the sixth aspect of the invention, the main DC circuit breaker has connected thereto two small DC circuit breakers including the parallel commutation circuit that has a smaller capacity than the main DC circuit breaker. This enables direct currents to be interrupted in a short time to reduce the stroke of the circuit breaker and the capacity of the commutation circuit, thereby reducing the size of the structure and costs.

According to a seventh invention, the auxiliary condenser is provided in at least the commutation circuit of the main DC circuit breaker. This enables direct currents to be interrupted in a short time to reduce the stroke of the circuit breaker and the capacity of the commutation circuit, thereby reducing the size of the structure and costs.

According to the eighth aspect of the invention, the capacity of the small DC circuit breaker is half to one-tenths of that of the main DC circuit breaker. This enables direct currents to be reliably interrupted in a short time to reduce the size and costs of the circuit breaker.

According to the ninth aspect of the invention, the capacity of the second DC circuit breaker is half to one-tenths of that of the first DC circuit breaker. This enables direct currents to be reliably interrupted in a short time to reduce the size and costs of the circuit breaker.

According to the tenth aspect of the invention, the capacity of the auxiliary condenser is half to one-tenths of that of the main condenser. This enables direct currents to be reliably interrupted in a short time to reduce the size and costs of the circuit breaker.

DETAILED DESCRIPTION OF THE PREFERRED EMBODIMENTS

Embodiment 1

One embodiment of this invention is described below with reference to the drawings.

Figure 1:
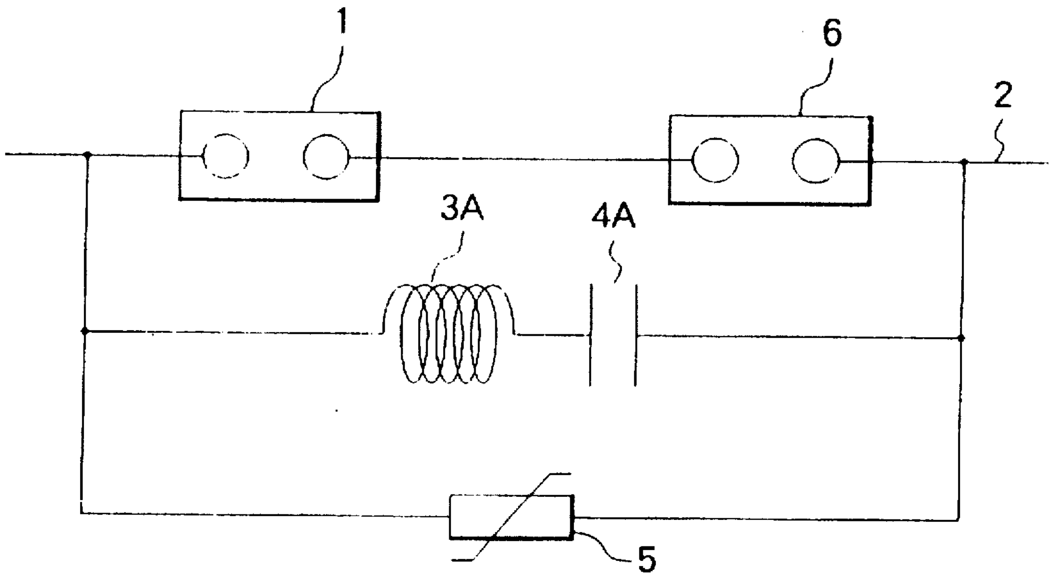
FIG. 1 is a block diagram showing a first embodiment of a DC circuit breaking device according to this invention.
Figure 8:
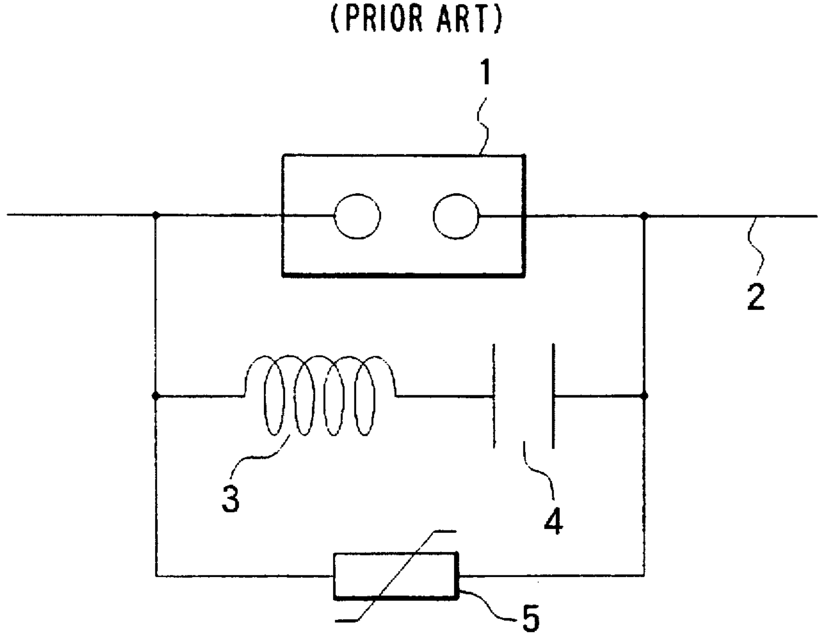
FIG. 8 (PRIOR ART)
FIG. 8 is a block diagram showing a conventional DC circuit breaking device.
Figure 9:
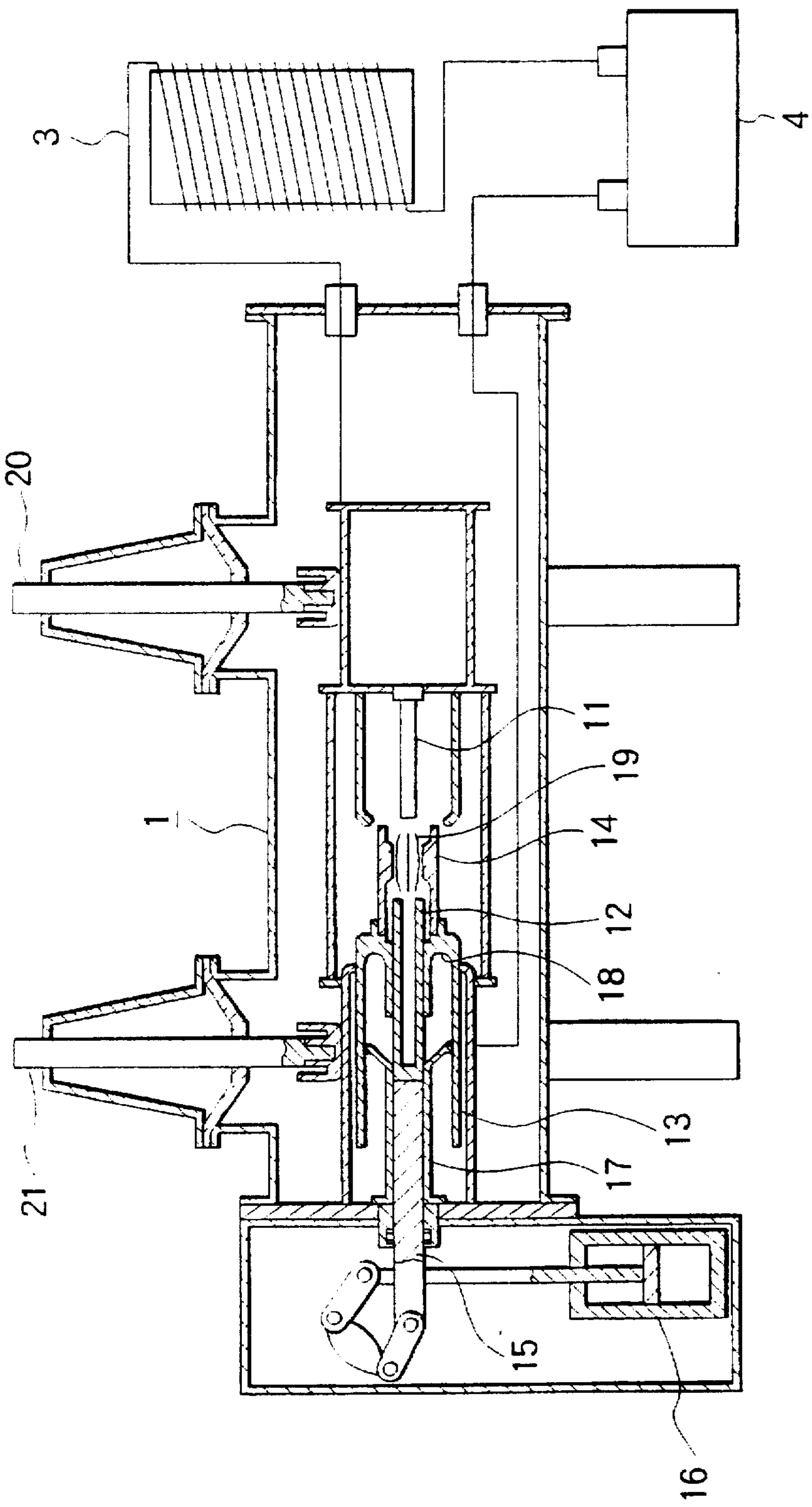
FIG. 9 (PRIOR ART)
FIG. 9 is a cross sectional view showing the structure of a conventional DC circuit breaking device.

FIG. 1 is a block diagram showing one embodiment of this invention. In this figure, the same components as in FIG. 8 has the same reference numerals, and their description is omitted.

In FIG. 1, 3A is a reactor disposed in parallel with a D.C. circuit breaker 1 as a main D.C. circuit breaker, and 4A is a condenser disposed in parallel with the D.C. circuit breaker 1. The reactor 3A and the condenser 4A are connected together in series to constitute a commutation circuit.

Reference numeral 6 designates a D.C. circuit breaker as a first small D.C. circuit breaker with a smaller capacity than the D.C. circuit breaker 1. The capacity of the D.C. circuit breaker 6 is, for example, half to one-tenths of that of the DC circuit breaker 1, that is, the energy lost from an arc by the DC circuit breaker 6 jetting a gas and determined by the jetting speed and flow of the gas is half to one-tenths of that by the DC circuit breaker 1. Specifically, the cross section of a puffer cylinder in which the gas is housed and the stroke of a piston rod are smaller. The DC circuit breaker 6 is located and connected in series to a DC line 2 to an electric power system. The commuting circuit comprising the reactor 3A and the condenser 4A is connected in parallel to the series circuit comprising the DC circuit breakers 1 and 6, and a surge absorber 5 is connected in parallel thereto. The surge absorber 5 may be simply connected in parallel to the condenser 4A.

Figure 10:
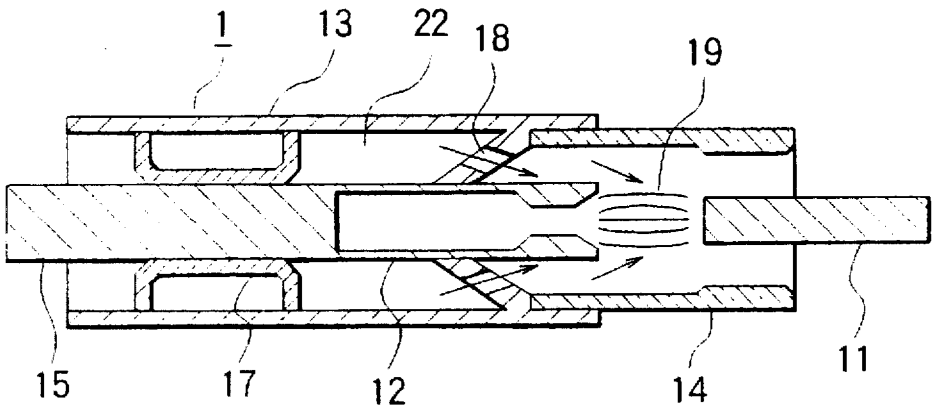
FIG. 10 (PRIOR ART)
FIG. 10 is an enlarged cross sectional view showing a puffer-type gas circuit breaker that is one example of the DC circuit breaker used in FIG. 9.
Figure 11A:
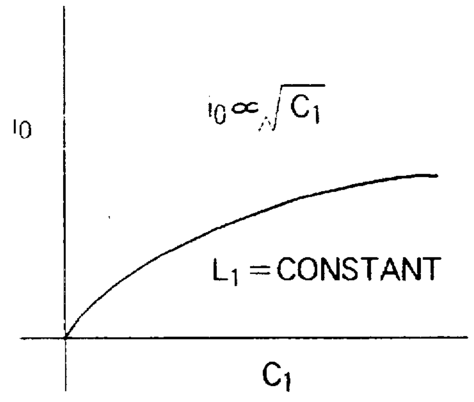
FIG. 11a (PRIOR ART)
FIGS. 11*a* and 11*b* are characteristic charts describing the operation of a conventional DC circuit breaking device.
Figure 11B:
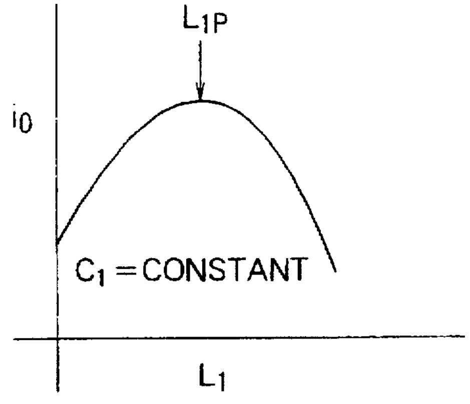
FIG. 11b (PRIOR ART)

In addition, the mechanical structure of the DC circuit breaker 6 may be similar to that of the DC circuit breaker 1 shown in FIG. 10. In addition, the time required by this small DC circuit breaker 6 to interrupt arcs of small currents is generally shorter than that by a larger DC circuit breaker.

Next, the operation is described.

When the fixed and movable contacts 11 and 12 (see FIG. 10) that transmit direct currents through the DC circuit breaker 1 are parted, an arc is generated between the contacts. Since the commutation circuit comprising the reactor 3A and the condenser 4A is connected in parallel to the DC circuit breaker 1, currents are commuted to this commutation circuit, while the interaction between the commutation circuit comprising the reactor 3A and the condenser 4A and the voltage and current negative characteristics of an $SF_6$ arc is used to extend arc voltage and current vibrations in order to form a current zero point. $SF_6$ gas is then jetted against the arc to extinguish it.

Since the small DC circuit breaker 6 is are connected to the DC circuit breaker 1, small arc currents, which have approached their zero point due to current and voltage vibrations of a frequency determined by the capacity of the reactor 3A and the condenser 4A constituting the commutation circuit, are quickly interrupted by this small DC circuit breaker 6*ni*. Direct currents can thus be interrupted in a short arc time.

This circuit breaking operation is described with reference to FIG. 2.

Suppose that the sole DC circuit breaker 6 can interrupt only about one-tenths of the current that can be interrupted by the DC circuit breaker 1. The DC circuit breaker 6 of a small capacity has a much smaller time constant [the relaxation time until the energy of the arc has been lost (the arc has been interrupted)] than the DC circuit breaker 1. Thus, if the contact parting of the DC circuit breakers 1 and 6 connected together in series is simultaneously carried out, the arc currents are mainly extended and vibrated by the interaction between the DC circuit breaker 1 and its commutation circuit when the currents are large. Once the arc currents have become smaller (have approached zero) due to the vibrations, the DC circuit breaker 6 can sufficiently interrupt the currents, and do so in a shorter time than the sole DC circuit breaker 1 due to its smaller arc time constant. That is, reducing the arc time (circuit breaking time) for currents enables the stroke and size of the circuit breaker to be reduced.

Figure 2A:
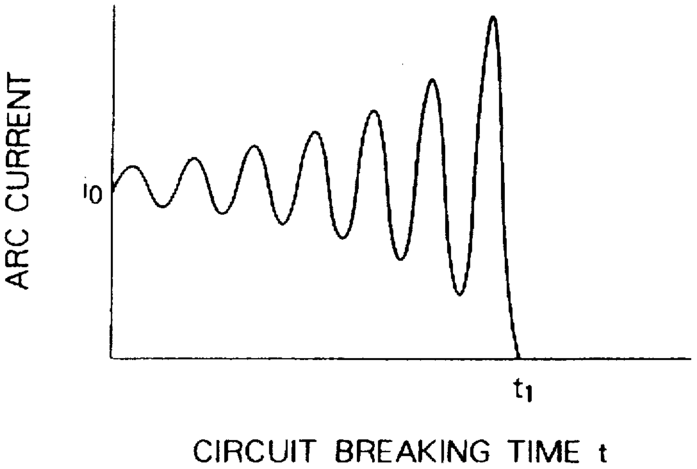
FIGS. 2*a* and 2*b* are characteristic charts showing a comparison of the circuit breaking time of the DC circuit breaking device according to this invention with that of a conventional DC circuit breaking device.
Figure 2B:
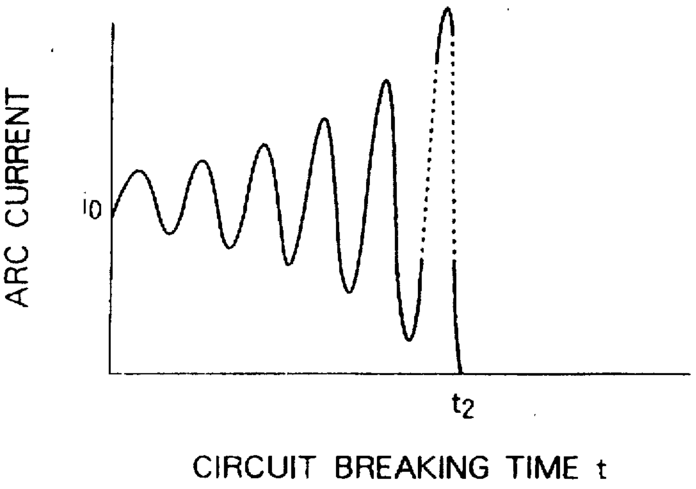

FIG. 2(*a*) shows the relationship between the arc current, that is, the current $i_0$ that can be interrupted and the circuit breaking time (t) in the case in which only the DC circuit breaker 1 was used (a conventional example), while FIG. 2(*b*) shows the relationship between the arc current, that is, the current $i_0$ that can be interrupted and the circuit breaking time (t) in the case in which the DC circuit breakers 1 and 6 connected together in series were used (this invention).

As seen from the figure, the circuit breaking time was $t_1$ when only the DC circuit breaker 1 was used, whereas the time $t_2$ was significantly shorter than the conventional circuit breaking time $t_1$ when the DC circuit breakers 1 and 6 connected together in series were used. When the circuit breaking current was 3,500 A, the conventional circuit breaking time $t_1$ was about 20 ms, whereas this embodiment of this invention reduced it by about several ms when the capacity of the DC circuit breaker 6 was one-tenths of that of the DC circuit breaker 1.

This shows that even a commutation circuit of a reduced capacity enables the interruption of direct currents of the same level as conventional examples. The contact parting of the DC circuit breaker 6 may be carried out later than the contact parting of the DC circuit breaker 1, for example, when the arc current is 20 A or below. In addition, the level of the current that can be interrupted by the DC circuit breaker relative to the circuit breaking current of the DC circuit breaker 1 is determined by trade off between the costs of the DC circuit breaker 1 and the additional costs of the DC circuit breaker 6 both of which are required when the arc time is reduced, but may be one-tenths.

As described above, in this embodiment of this invention, the DC circuit breaker 1 has connected in series thereto the small DC circuit breaker 6 that has a smaller capacity than the DC circuit breaker 1. This enables direct currents to be interrupted in a short arc time to reduce the stroke of the circuit breaker and the capacity of the commutation circuit, thereby reducing the size of the structure and costs.

Embodiment 2

Figure 3:
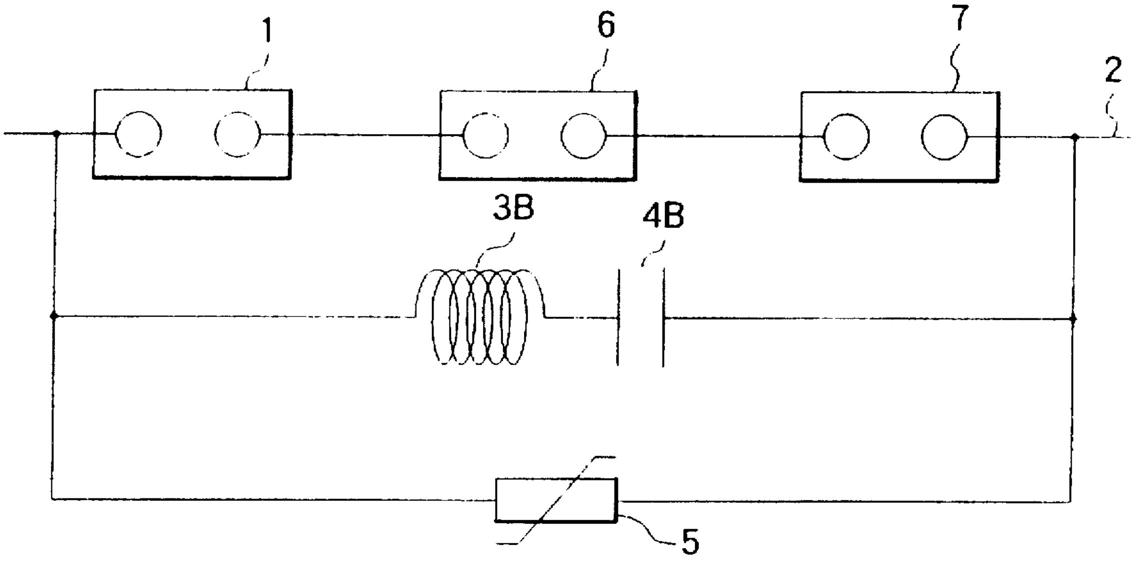
FIG. 3 is a block diagram showing a second embodiment of a DC circuit breaking device according to this invention.

FIG. 3 is a block diagram showing another embodiment of this invention. In this figure, the same components as in FIG. 1 have the same reference numerals, and their description is omitted.

In FIG. 3, 3B is a reactor disposed in parallel with the DC circuit breaker 1, and 4B is a condenser disposed in parallel with the DC circuit breaker 1. The reactor 3B and the condenser 4B are connected together in series to constitute a commutation circuit.

Reference numeral 7 denotes a DC circuit breaker as a second small DC circuit breaker with a smaller capacity than the DC circuit breaker 6. The capacity of the DC circuit breaker 7 is, for example, half to one-tenths of that of the DC circuit breaker 6. The commuting circuit comprising the reactor 3B and the condenser 4B is connected in parallel to the series circuit comprising the DC circuit breaker 1, 6, and 7, and a surge absorber 5 is connected in parallel thereto. The mechanical structure of the DC circuit breaker 7 may be similar to that of the DC circuit breaker 1 shown in FIG. 10. In addition, the time required by this small DC circuit breaker 7 to interrupt arcs of small currents is generally shorter than that by a larger DC circuit breaker.

Next, the operation is described.

When the fixed and the movable contacts 11 and 12 (see FIG. 10) that transmit direct currents through the DC circuit breaker 1 are parted, an arc is generated between the contacts. Since the commutation circuit comprising the reactor 3B and the condenser 4B is connected in parallel to the DC circuit breaker 1, currents are commuted to this commutation circuit, while the interaction between the commutation circuit comprising the reactor 3A and the condenser 4A and the voltage and current negative characteristics of an $SF_6$ arc is used to extend arc voltage and current vibrations in order to form a current zero point. $SF_6$ gas is then jetted against the arc to extinguish it.

Since the small DC circuit breakers 6 and 7 are connected to the DC circuit breaker 1, small arc currents, which have approached their zero point due to current and voltage vibrations of a frequency determined by the capacity of the reactor 3B and the condenser 4B constituting the commutation circuit, are quickly interrupted by these small DC circuit breakers 6 and 7. Direct currents can thus be interrupted in a short arc time.

Consequently, in this case, the stroke and size of the circuit breaker can also be reduced due to the reduced arc time for currents (the circuit breaking time).

In addition, even a commutation circuit of a reduced capacity enables the interruption of direct currents of the same level as conventional examples. In particular, since in this embodiment, the capacity of the DC circuit breaker 7 is half to one-tenths of the DC circuit breaker 6, the capacity of the reactor 3A and the condenser 4A in FIG. 1 may further be reduced, that is, may be smaller than that of the reactor 3A and the condenser 4A if the arc time is constant.

As described above, in this embodiment of this invention, the DC circuit breaker 1 has connected in series thereto the small DC circuit breakers 6 and 7 that have a smaller capacity than the DC circuit breaker 1. This enables direct currents to be interrupted in a short arc time to reduce the stroke of the circuit breaker and the capacity of the commutation circuit, thereby reducing the size of the structure and costs.

Embodiment 3

Figure 4:
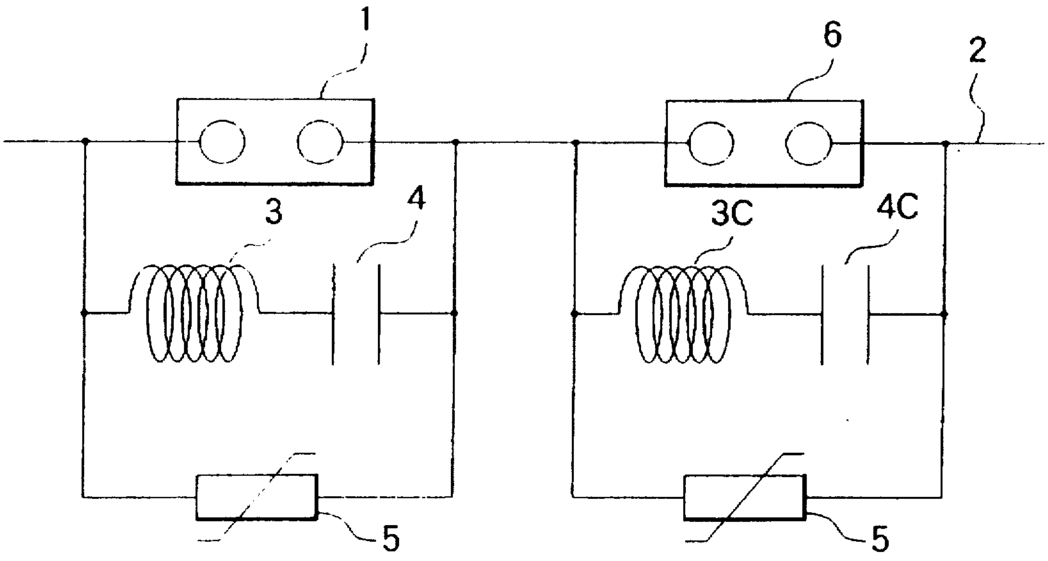
FIG. 4 is a block diagram showing a third embodiment of a DC circuit breaking device according to this invention.

FIG. 4 is a block diagram showing another embodiment of this invention. In this figure, the same components as in FIG. 1 have the same reference numerals, and their description is omitted.

In FIG. 4, 3C is a reactor disposed in parallel with the DC circuit breaker 1, and 4C is a condenser disposed in parallel with the DC circuit breaker 1. The reactor 3C and the condenser 4C are connected together in series to constitute a commutation circuit.

In this embodiment of this invention, the commuting circuit comprising the reactor 3C and the condenser 4C is cascade-connected to the DC circuit breaker including the commutation circuit comprising the reactor 3 and the condenser 4.

Next, the operation is described.

When the fixed and the movable contacts 11 and 12 (see FIG. 10) that transmit direct currents through the DC circuit breaker 1 are parted, an arc is generated between the contacts. Since the commutation circuit comprising the reactor 3 and the condenser 4 is connected in parallel to the DC circuit breaker 1, currents are commuted to this commutation circuit, while the interaction between the commutation circuit comprising the reactor 3 and the condenser 4 and the voltage and current negative characteristics of an $SF_6$ arc is used to extend arc voltage and current vibrations in order to form a current zero point. $SF_6$ gas is then jetted against the arc to extinguish it.

Since the small DC circuit breaker 6 including the commutation circuit is connected to the DC circuit breaker 1, small arc currents, which have approached their zero point due to current and voltage vibrations of a frequency determined by the capacity of the reactor 3C and the condenser 4C constituting the commutation circuit, are quickly interrupted by this small DC circuit breaker 6. Direct currents can thus be interrupted in a short arc time.

Consequently, in this case, the stroke and size of the circuit breaker can also be reduced due to the reduced arc time for currents (the circuit breaking time).

In addition, even a commutation circuit of a reduced capacity enables the interruption of direct currents of the same level as conventional examples. In particular, since in this embodiment, the capacity of the DC circuit breaker 6 is half to one-tenths of the DC circuit breaker 1, the capacity of the reactor 3C and the condenser 4C may further be reduced, that is, may be smaller than that of the reactor 3 and the condenser 4 if the arc time is constant.

As described above, in this embodiment of this invention, the DC circuit breaker 1 has connected in series thereto the small DC circuit breaker 6 that have a smaller capacity than the DC circuit breaker 1 and which also includes a parallel commutation circuit. This enables direct currents to be interrupted in a short arc time to reduce the stroke of the circuit breaker and the capacity of the commutation circuit, thereby reducing the size of the structure and costs.

Embodiment 4

Figure 5:
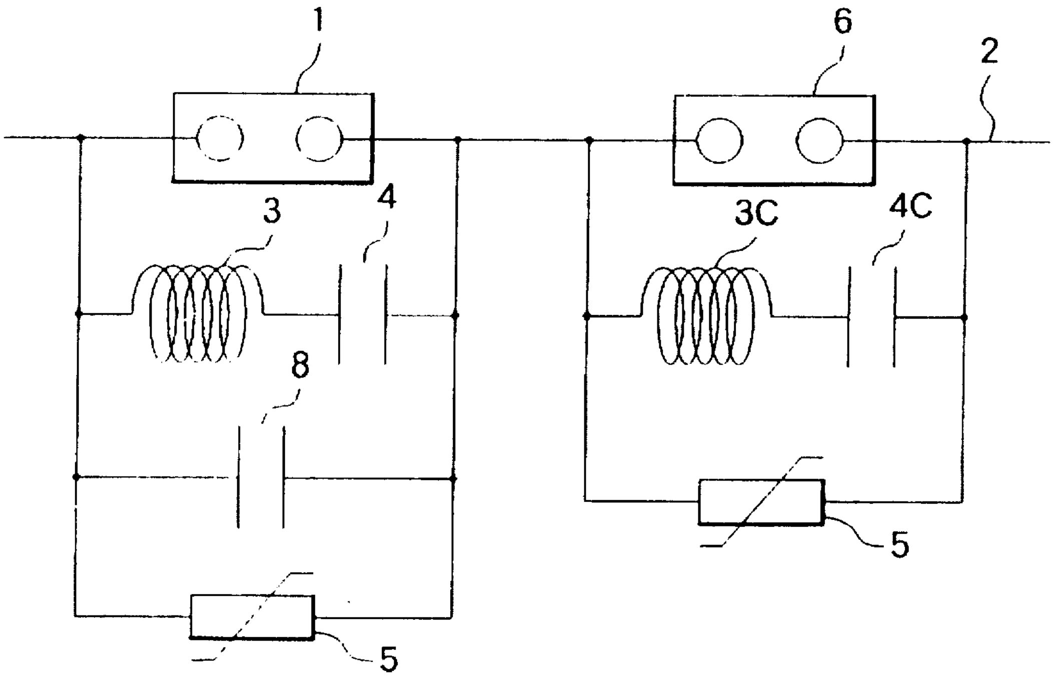
FIG. 5 is a block diagram showing a fourth embodiment of a DC circuit breaking device according to this invention.

FIG. 5 is a block diagram showing another embodiment of this invention. In this figure, the same components as in FIG. 4 have the same reference numerals, and their description is omitted.

In FIG. 5A, an auxiliary condenser 8 is connected in parallel to the first commutation circuit comprising the reactor 3 and the condenser 4 which are connected in parallel to the DC circuit breaker 1 in the circuit in FIG. 5 in order to substantially form a second commutation circuit for the DC circuit breaker.

The capacity of the auxiliary condenser 8 is smaller than, for example, half to one-tenths of that of the condenser 4.

Next, the operation is described.

When the fixed and the movable contacts 11 and 12 (see FIG. 10) that transmit direct currents through the DC circuit breaker 1 are parted, an arc is generated between the contacts. Since the commutation circuit comprising the reactor 3 and the condenser 4 is connected in parallel to the DC circuit breaker 1, currents are commuted to this commutation circuit, while the interaction between the commutation circuit comprising the reactor 3 and the condenser 4 and the voltage and current negative characteristics of an $SF_6$ arc is used to extend arc voltage and current vibrations in order to form a current zero point. $SF_6$ gas is then jetted against the arc to extinguish it.

Since the second commutation circuit including the auxiliary condenser 8 connected in parallel to the first commutation circuit is connected to the DC circuit breaker 1, vibrations of a high frequency determined by the capacity of the auxiliary condenser 8 are superposed on current and voltage vibrations of a frequency determined by the capacity of the reactor 3 and the condenser 4 constituting the first commutation circuit. This more significantly varies the arc voltage to cause arc currents to be rapidly extended and vibrated, enabling direct currents to be interrupted in a short arc time.

Figure 6A:
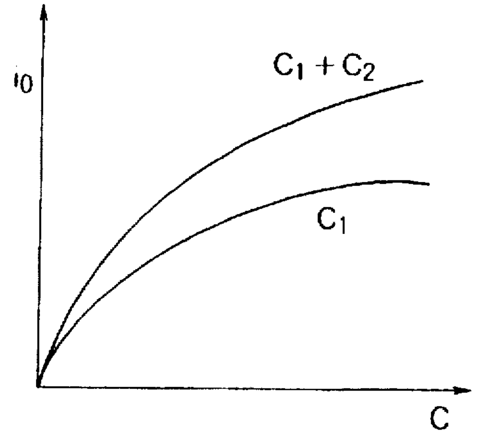
FIGS. 6*a* and 6*b* are characteristic charts describing the operation of the device FIG. 5.
Figure 6B:
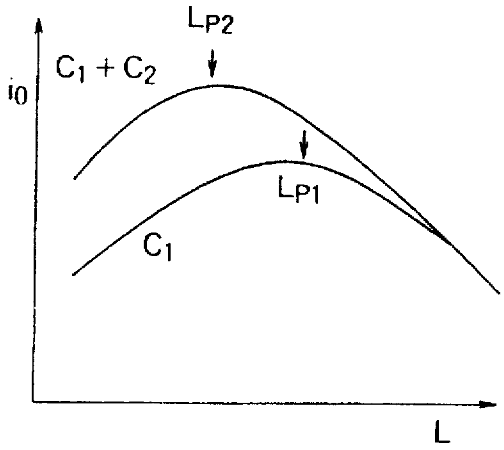

FIG. 6 shows the relationship between the circuit breaking current $i_0$ and the capacity C of the condenser 4 and the capacity L of the reactor 3. When the auxiliary condenser 8 of the capacity $C_2$ is connected in parallel to the first commuting circuit comprising the reactor 3 of the capacity $L_1$ and the condenser 4 of the capacity $C_1$, the currents are distributed not only to simply increase the circuit breaking current $i_0$ but also to increase the frequency of the vibrations to reduce the optimum value of the capacity of the reactor 3 from $L_{p1}$ to $L_{p2}$. That is, the capacity of the reactor 3 is reduced to enable the reactor 3 to be compact. The circuit breaking is also increased to enable the capacity of the condenser 4 to be reduced.

Consequently, in this case, the stroke and size of the circuit breaker can also be reduced due to the reduced arc time for currents (the circuit breaking time).

In addition, even a commutation circuit of a reduced capacity enables the interruption of direct currents of the same level as conventional examples.

As described above, in this embodiment of this invention, the auxiliary condenser is disposed in parallel with the commuting circuit for the DC circuit breaker 1. This enables direct currents to be interrupted in a short arc time to reduce the stroke of the circuit breaker and the capacity of the commutation circuit, thereby reducing the size of the structure and costs.

Embodiment 5

Figure 7:
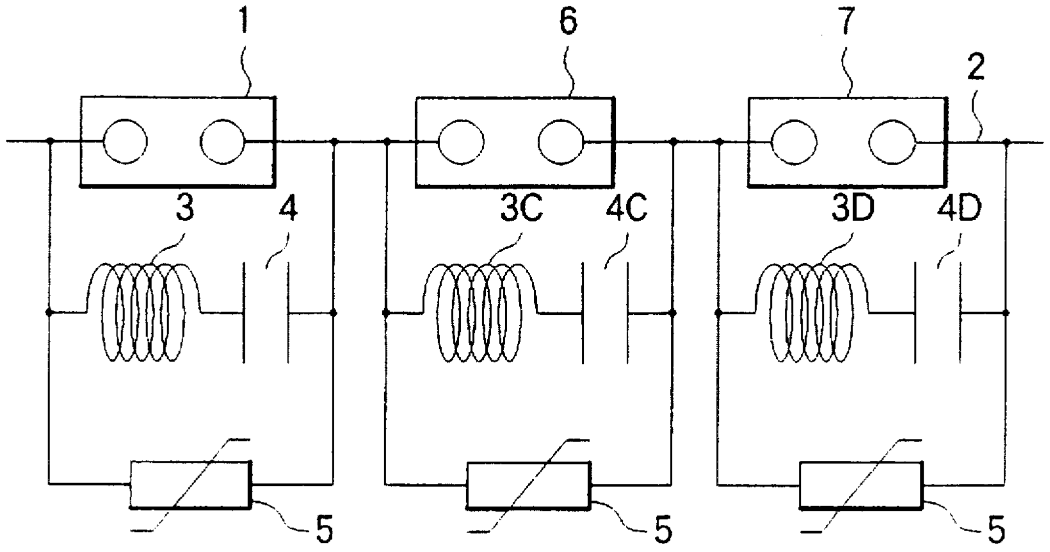
FIG. 7 is a block diagram showing a fifth embodiment of a DC circuit breaking device according to this invention.

FIG. 7 is a block diagram showing another embodiment of this invention. In this figure, the same components as in FIGS. 1 and 4 have the same reference numerals, and their description is omitted.

In FIG. 7, 3D is a reactor disposed in parallel with the DC circuit breaker 7, and 4D is a condenser disposed in parallel with the DC circuit breaker 7. The reactor 3D and the condenser 4D are connected together in series to constitute a commutation circuit.

In this embodiment of this invention, the DC circuit breaker 7 including the commuting circuit comprising the reactor 3D and the condenser 4D is further cascade-connected to the cascade-connected circuit of the DC circuit breaker 1 including the commutation circuit comprising the reactor 3 and the condenser 4 and the DC circuit breaker 6 the commutation circuit comprising the reactor 3C and the condenser 4C.

Next, the operation is described.

When the fixed and the movable contacts 11 and 12 (see FIG. 10) that transmit direct currents through the DC circuit breaker 1 are parted, an arc is generated between the contacts. Since the commutation circuit comprising the reactor 3 and the condenser 4 is connected in parallel to the DC circuit breaker 1, currents are commuted to this commutation circuit, while the interaction between the commutation circuit comprising the reactor 3 and the condenser 4 and the voltage and current negative characteristics of an $SF_6$ arc is used to extend arc voltage and current vibrations in order to form a current zero point. The $SF_6$ gas is then jetted against the arc to extinguish it.

Since the DC circuit breaker 1 has connected thereto the small DC circuit breaker 6 of a small capacity including the commuting circuit and the small DC circuit breaker 7 that has a smaller capacity than the circuit breaker 6 and which includes the commuting circuit, small arc currents, which have approached their zero point due to current and voltage vibrations of a frequency determined by the capacity of the reactor 3D and the condenser 4D substantially constituting the commutation circuit of the DC circuit breaker 7, are quickly interrupted by this small DC circuit breaker 7. Direct currents can thus be interrupted in a short arc time.

Consequently, in this case, the stroke and size of the circuit breaker can also be reduced due to the reduced arc time for currents (the circuit breaking time).

In addition, even a commutation circuit of a reduced capacity enables the interruption of direct currents of the same level as conventional examples. In particular, since in this embodiment, the commuting circuit of the DC circuit breaker 7 has a high resonant frequency, and the capacity of the DC circuit breaker 7 is half to one-tenths of the DC circuit breaker 6, the capacity of the reactor 3D and the condenser 4D may further be reduced to about half to one-tenths of that of the reactor 3C and the condenser 4C if the arc time is constant.

As described above, in this embodiment of this invention, the DC circuit breaker 1 has connected in series thereto the DC circuit breaker 6 that has a smaller capacity than the DC circuit breaker 1 and which includes a parallel commuting circuit and the DC circuit breaker 7 that has a smaller capacity than the DC circuit breaker 6 and which includes a commuting circuit. This enables direct currents to be interrupted in a short arc time to reduce the stroke of the circuit breaker and the capacity of the commutation circuit, thereby reducing the size of the structure and costs.

Embodiment 6

Although in the above embodiments, one or two small DC circuit breakers have been connected to the main DC circuit breaker, three or more such circuit breakers can be used to produce similar effects.

In addition, the auxiliary condenser may be connected to not only the commuting circuit connected to the main DC circuit breaker but also the commuting circuit of the following small DC circuit breaker.

As described above, the DC circuit breaking device according to the first aspect of the invention comprises a main DC circuit breaker for interrupting the transmission of direct currents to an electric power system, at least one DC circuit breaker that is connected in series to the main DC circuit breaker and which is smaller than the main DC circuit breaker, a commutation circuit that is connected in parallel to the series circuit comprising the main and the small DC circuit breakers and which comprises a reactor and a condenser, and a surge absorber connected to the condenser. This enables direct currents to be interrupted in a short arc time to reduce the stroke of the circuit breaker and the capacity of the commutation circuit, thereby reducing the size of the structure and costs.

According to the second aspect of the invention, the small DC circuit breaker comprises a single DC circuit breaker. This enables direct currents to be interrupted in a short arc time using a simple structure, thereby reducing the size of the structure and costs.

According to the third aspect of the invention, the small DC circuit breaker comprises a first and a second DC circuit breakers. This enables direct currents to be interrupted in a shorter arc time, thereby reducing the size of the structure and costs.

According to the fourth aspect of the invention, the DC circuit breaking device comprises a main DC circuit breaker for interrupting the transmission of direct currents to an electric power system, at least one DC circuit breaker that is connected in series to the main DC circuit breaker and which is smaller than the main DC circuit breaker, a commuting circuit that is connected in parallel to each of the main and the small circuit breakers, and a surge absorber connected to the condenser. This enables direct currents to be interrupted in a short arc time to reduce the stroke of the circuit breaker and the capacity of the commutation circuit, thereby reducing the size of the structure and costs.

According to the fifth aspect of the invention, the small DC circuit breaker comprises a single DC circuit breaker with a commutation circuit and a surge absorber connected in parallel thereto. This enables direct currents to be interrupted in a short arc time using a simple structure, thereby reducing the size of the structure and costs.

According to the sixth aspect of the invention, the small DC circuit breaker comprises a first and a second DC circuit breakers each of which comprises the commuting circuit and the surge absorber connected in parallel thereto. This enables direct currents to be interrupted in a shorter arc time, thereby reducing the size of the structure and costs.

According to the seventh aspect of the invention has an auxiliary condenser connected in parallel to at least one of the commutation circuits which is connected in parallel to the main DC circuit breaker.

This enables direct currents to be interrupted in a short arc time to reduce the stroke of the circuit breaker and the capacity of the commutation circuit, thereby reducing the size of the structure and costs.

According to the eighth aspect of the invention, the capacity of the small DC circuit breaker is half to one-tenths of that of the main DC circuit breaker. This enables direct currents to be reliably interrupted in a shorter arc time, thereby reducing the size and costs of the circuit breaker.

According to the aspect of the invention, the capacity of the second DC circuit breaker is half to one-tenths of that of the first DC circuit breaker. This enables direct currents to be reliably interrupted in a shorter arc time, thereby reducing the size and costs of the circuit breaker.

According to the tenth aspect of the invention, the capacity of the auxiliary condenser is half to one-tenths of that of the main condenser. This enables direct currents to be reliably interrupted in a shorter arc time, thereby reducing the size and costs of the circuit breaker.

What is claimed is:

1. A DC circuit breaking device comprising:

a main DC circuit breaker for interrupting the transmission of direct currents to an electric power system;

at least one DC circuit breaker that is connected in series to the main DC circuit breaker and which is smaller than said main DC circuit breaker;

a commutation circuit that is connected in parallel to the series circuit comprising said main and small DC circuit breakers and which comprises a reactor and a condenser; and a surge absorber connected in parallel across said commutation circuit for absorbing a surged voltage applied to said condenser.

2. A DC circuit breaking device according to claim 1, wherein said small DC circuit breaker comprises a single DC circuit breaker.

3. A DC circuit breaking device according to claim 1, wherein said small DC circuit breaker comprises a first and a second DC circuit breakers.

4. A DC circuit breaking device according to claim 3, wherein the capacity of said second DC circuit breaker is half to one-tenths of that of said first DC circuit breaker.

5. A DC circuit breaking device according to claim 1, wherein the capacity of said small DC circuit breaker is half to one-tenths of that of said main DC circuit breaker.

6. A DC circuit breaking device comprising:

a main DC circuit breaker for interrupting the transmission of direct currents to an electric power system;

at least one DC circuit breaker that is connected in series to the main DC circuit breaker and which is smaller than said main DC circuit breaker;

a commuting circuit that is connected in parallel to each of said main and small DC circuit breakers and which comprises a reactor and a main condenser; and a surge absorber for said main condenser.

7. A DC circuit breaking device according to claim 6, wherein said small DC circuit breaker comprises a single DC circuit breaker with a commutation circuit and a surge absorber connected in parallel thereto.

8. A DC circuit breaking device according to claim 6, wherein said small DC circuit breaker comprises a first and a second DC circuit breaker each of which comprises said commuting circuit and said surge absorber connected in parallel thereto.

9. A DC circuit breaking device according to claim 6, having an auxiliary condenser connected in parallel to at least one of the commutation circuits which is connected in parallel with said main DC circuit breaker.

10. A DC circuit breaking device according to claim 9, wherein the capacity of said auxiliary condenser is half to one-tenths of that of said main condenser.

* * * * *